(12) United States Patent
Dills et al.

(10) Patent No.: US 12,184,560 B1
(45) Date of Patent: Dec. 31, 2024

(54) CAUSAL ANALYSIS FOR NETWORK ENVIRONMENT CHANGES

(71) Applicant: Capital One Services, LLC, McLean, VA (US)

(72) Inventors: Steven Matthew Dills, Mechanicsville, VA (US); William Scott Whitlock, Louisville, KY (US); Robert Sean Farmer, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/360,301

(22) Filed: Jul. 27, 2023

(51) Int. Cl.
*G06F 15/16* (2006.01)
*H04L 43/0876* (2022.01)
*H04L 47/70* (2022.01)
*H04L 47/80* (2022.01)

(52) U.S. Cl.
CPC ........ *H04L 47/803* (2013.01); *H04L 43/0876* (2013.01); *H04L 47/82* (2013.01)

(58) Field of Classification Search
CPC .... H04L 43/0876; H04L 47/82; H04L 47/803
USPC ........................................................ 709/224
See application file for complete search history.

(56) References Cited

U.S. PATENT DOCUMENTS

| 6,993,722 | B1* | 1/2006 | Greer | H04N 21/4821 |
| | | | | 715/764 |
| 7,831,975 | B2* | 11/2010 | Ode | G06F 9/52 |
| | | | | 718/103 |
| 8,832,380 | B2* | 9/2014 | Ishikawa | G06F 12/084 |
| | | | | 711/129 |
| 9,292,349 | B2* | 3/2016 | Clark | G06F 8/60 |
| 9,298,511 | B2* | 3/2016 | Clark | G06F 9/4881 |
| 9,311,154 | B2* | 4/2016 | Clark | G06F 9/4806 |
| 9,317,332 | B2* | 4/2016 | Clark | G06F 9/5044 |
| 9,319,286 | B2 | 4/2016 | Panuganty | |
| 9,451,468 | B2* | 9/2016 | Lennvall | H04W 16/14 |
| 9,606,785 | B2* | 3/2017 | Clark | G06F 9/4806 |
| 9,619,389 | B1* | 4/2017 | Roug | G06F 3/064 |
| 10,574,545 | B2* | 2/2020 | Feller | G06F 9/5072 |
| 2008/0134276 | A1* | 6/2008 | Orrell | H04H 20/426 |
| | | | | 725/132 |
| 2009/0300017 | A1* | 12/2009 | Tokusho | G06F 16/2343 |
| 2013/0067448 | A1* | 3/2013 | Sannidhanam | G06F 8/60 |
| | | | | 717/169 |

(Continued)

*Primary Examiner* — Moustafa M Meky
(74) *Attorney, Agent, or Firm* — Harrity & Harrity, LLP

(57) ABSTRACT

In some implementations, a device may obtain deployment information, associated with a deployment of a first application, indicating first network resources to be associated with the deployment of the first application in a network. The device may obtain network usage information indicating second network resources associated with one or more second applications in the network, where the second network resources are associated with the first network resources in an infrastructure of the network. The device may detect, based on the first network resources, the second network resources, and the infrastructure, that a network resource conflict will occur if the first application is deployed using the first network resources, wherein the network resource conflict is associated with an impact to a performance of at least one application from the one or more second applications. The device may perform an action associated with the deployment of the first application.

20 Claims, 6 Drawing Sheets

(56) References Cited

U.S. PATENT DOCUMENTS

2017/0048115 A1\* 2/2017 Wang .................. H04L 41/0895
2024/0163649 A1\* 5/2024 Akman ................. H04W 24/04

\* cited by examiner ns. The set of instructions, when executed by one
or more processors of a device, may cause the device to
obtain deployment information associated with a deployment of a first application, wherein the deployment information indicates first network resources to be used to deploy
the first application via a network. The set of instructions,
when executed by one or more processors of the device, may
cause the device to obtain network usage information indicating second network resources associated with one or
more second applications in the network. The set of instructions, when executed by one or more processors of the
device, may cause the device to detect, based on the first
network resources, the second network resources, and a
network capacity capability of the network, whether a network resource conflict will occur if the first application is
deployed using the first network resources, wherein the
network resource conflict is associated with an impact to a
performance of at least one application from the one or more
second applications. The set of instructions, when executed
by one or more processors of the device, may cause the
device to perform, based on detecting that the network
resource conflict will occur, an action associated with the
deployment of the first application.

CAUSAL ANALYSIS FOR NETWORK ENVIRONMENT CHANGES

BACKGROUND

Cloud computing is a model for delivering computing resources over a network. Cloud computing environments allow devices to access shared pools of configurable computing resources, such as servers, storage, and applications, on-demand, without the need for direct management or ownership of the underlying infrastructure. Cloud computing environments may be associated with a variety of services, such as infrastructure-as-a-service (IaaS), platform-as-a-service (PaaS), and/or software-as-a-service (SaaS), among other examples.

SUMMARY

Some implementations described herein relate to a system for causal analysis for network environment changes. The system may include one or more memories and one or more processors communicatively coupled to the one or more memories. The one or more processors may be configured to obtain deployment information associated with a deployment of a first application. The one or more processors may be configured to determine, based on the deployment information, first network resources to be used to deploy the first application via a network. The one or more processors may be configured to obtain network usage information indicating second network resources associated with one or more second applications in the network. The one or more processors may be configured to detect, based on the first network resources, the second network resources, and a network capacity capability of the network, whether a network resource conflict will occur if the first application is deployed using the first network resources, wherein the network resource conflict is associated with an impact to a performance of at least one application from the one or more second applications. The one or more processors may be configured to perform, based on detecting that the network resource conflict will occur, an action associated with the deployment of the first application.

Some implementations described herein relate to a method for causal analysis of network environment changes. The method may include obtaining, by a device, deployment information associated with a deployment of a first application, wherein the deployment information indicates first network resources to be associated with the deployment of the first application in a network. The method may include obtaining, by the device, network usage information indicating second network resources associated with one or more second applications in the network, wherein the second network resources are associated with the first network resources in an infrastructure of the network. The method may include detecting, by the device and based on the first network resources, the second network resources, and the infrastructure of the network, that a network resource conflict will occur if the first application is deployed using the first network resources, wherein the network resource conflict is associated with an impact to a performance of at least one application from the one or more second applications. The method may include performing, by the device based on detecting that the network resource conflict will occur, an action associated with the deployment of the first application.

Some implementations described herein relate to a non-transitory computer-readable medium that stores a set of instructions.

DETAILED DESCRIPTION

Figure 1A:
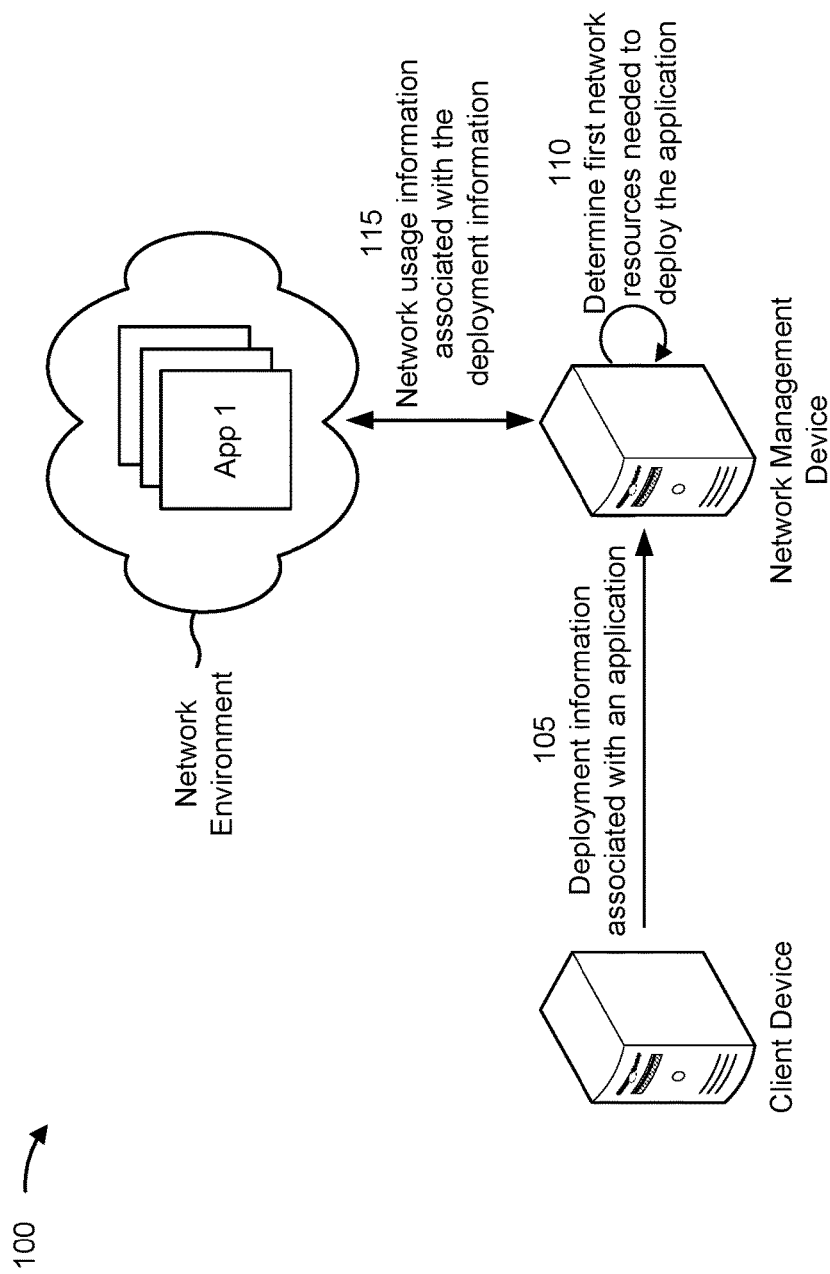
FIGS. 1A-1C are diagrams of an example associated with causal analysis for network environment changes, in accordance with some embodiments of the present disclosure.

The following detailed description of example implementations refers to the accompanying drawings. The same reference numbers in different drawings may identify the same or similar elements.

A cloud computing network provides an organization with a flexible and scalable infrastructure to store, process, and access data and applications without the need for on-premises hardware and infrastructure. For example, the cloud computing network may provide virtualized computing resources, such as virtual machines (VMs), storage, and/or networks. As a result, the organization can easily provision and manage network infrastructure, scaling resources up or down based on demand. The cloud computing network may eliminate the need for organizations to invest in and maintain physical infrastructure, resulting in reduced costs and increased operational efficiency. As another example, the cloud computing network may enable an organization to develop, deploy, and manage applications without the complexity of underlying infrastructure management (e.g., by offering a ready-to-use environment that includes development frameworks, databases, and other tools required for application development). In general, a cloud computing network provides the organization with numerous technical benefits, such as scalability, cost efficiency, reliability, and/ or enhanced collaboration, among other examples. The cloud computing network may enable organizations to focus on core business objectives and innovation while leveraging scalable and resilient infrastructure and services provided by cloud providers.

However, as a size and/or complexity of the organization increases, managing the cloud computing network may become more difficult. As a result, the organization may use specialized teams or units to manage specific network components or services of the cloud computing network. For example, a given team may be responsible for managing and/or maintaining a specific network component or service, thereby reducing the complexity of managing the cloud computing network (e.g., because a given team may not need to manage all portions of the cloud computing network). As an example, an organization may include one or more network architecture teams (e.g., associated with designing the network architecture of the cloud infrastructure), one or more network engineering teams (e.g., associated with implementing and maintaining the cloud network infrastructure), one or more security teams (e.g., associated with implementing and maintaining security measures to protect the organization's cloud infrastructure from potential threats and vulnerabilities), one or more operations teams (e.g., associated with performing day-to-day operational tasks in managing the cloud network), and/or one or more software development and operations (DevOps) teams (e.g., associated with managing deployment processes, managing configuration and version control, and/or streamlining collaboration between development teams and cloud network management teams), among other examples.

Using specialized teams reduces the complexity and/or improves the efficiency associated with managing the cloud computing network for large and/or complex organizations. However, the use of such specialized teams may introduce one or more challenges. For example, specialized teams may focus on a specific domain of expertise, which can lead to siloed knowledge. This can result in challenges in addressing complex issues that require a holistic understanding of the cloud computing network. As another example, coordination and integration issues may arise. For example, cloud computing network management involves various interdependent components, such as networking, security, storage, and/or application services, among other examples. Specialized teams may face difficulties in coordinating their activities and integrating their work effectively. Lack of synchronization between teams can result in configuration conflicts, compatibility issues, and/or inefficient resource utilization, among other examples.

As an example, a cloud computing network may include an availability zone (e.g., an availability zone may be a logical grouping of network resources within a cloud provider's infrastructure, typically composed of one or more data centers or facilities located in separate physical locations within a specific geographical region). Multiple teams and/or applications associated with an organization may use network resources associated with a given availability zone. For example, an availability zone may be associated with one or more classes inter-domain routing (CIDR) ranges that are assigned to a set of internet protocol (IP) addresses to define network boundaries. A team may identify that, to perform a task and/or manage an application, additional IP addresses may be needed within the availability zone. The team may cause one or more CIDR ranges to be added to the availability zone. However, the team may be unaware of other teams and/or applications using the network resources of the availability zone. The modification of the availability zone (e.g., the addition of the CIDR range(s)) may impact the ability of other teams and/or applications to use the network resources of the availability zone and/or may negatively impact the performance of applications that use the network resources of the availability zone. For example, a security group and/or a security permission of another team and/or application may not include the newly added CIDR range(s), thereby causing connectivity and/or accessibility issues for the team and/or application when attempting to use the network resources of the availability zone.

Some implementations described herein enable causal analysis for network environment changes. For example, a network management device may perform a causal analysis of an impact to one or more teams and/or applications using network resources of a network environment (e.g., a cloud computing environment) that would result from changes or modifications to the network environment. As an example, the network management device may analyze and/or identify conflicts that would arise from a deployment and/or change introduced for an application via the network environment. For example, the network management device may analyze issues from the perspective of teams and/or applications currently executing and/or using network resources of the network (e.g., issues that would be caused by the deployment of another application). The network management device may provide an indications of any identified issues or conflicts to an account and/or team associated with the application that is to be deployed.

In some implementations, the network management device may obtain deployment information associated with a deployment of a given application. The network management device may determine, based on the deployment information, first network resources to be used to deploy the first application via a network (e.g., a cloud computing network). The network management device may obtain network usage information indicating second network resources associated with one or more second applications in the network. The network management device may detect, based on the first network resources, the second network resources, and/or a network capacity capability of the network, whether a network resource conflict will occur if the first application is deployed using the first network resources.

In some implementations, the network management device may predict one or more network resource conflicts that may occur in the future. For example, the second network resources may be associated with a predicted traffic level of the one or more second applications at or after a time at which the first application is to be deployed. The network management device may determine one or more recommended modifications to the deployment of the first application to mitigate a detected network resource conflict.

As a result, the network management device may preemptively detect and/or mitigate network resource conflicts caused by a deployment of an application in a network environment (e.g., in a cloud computing environment). For example, the network management device may provide an indication of one or more detected network resource conflicts (e.g., that would be caused by a deployment of an application) to a device associated with the application. This enables a team and/or developer associated with the application to preemptively identify issues caused to other applications executing via the network that may result from the deployment of the application. As a result, the detected network resource conflict(s) may be eliminated and/or mitigated prior to the deployment of the application without a team and/or developer of the application having access to information associated with other teams and/or applications using the network. The improves the synchronization between teams of an organization, thereby reducing configuration conflicts, compatibility issues, and/or inefficient resource utilization, among other examples, that would otherwise result from specialized teams having isolated and/or limited knowledge of operations performed by other specialized teams within an organization.

Figure 1B:
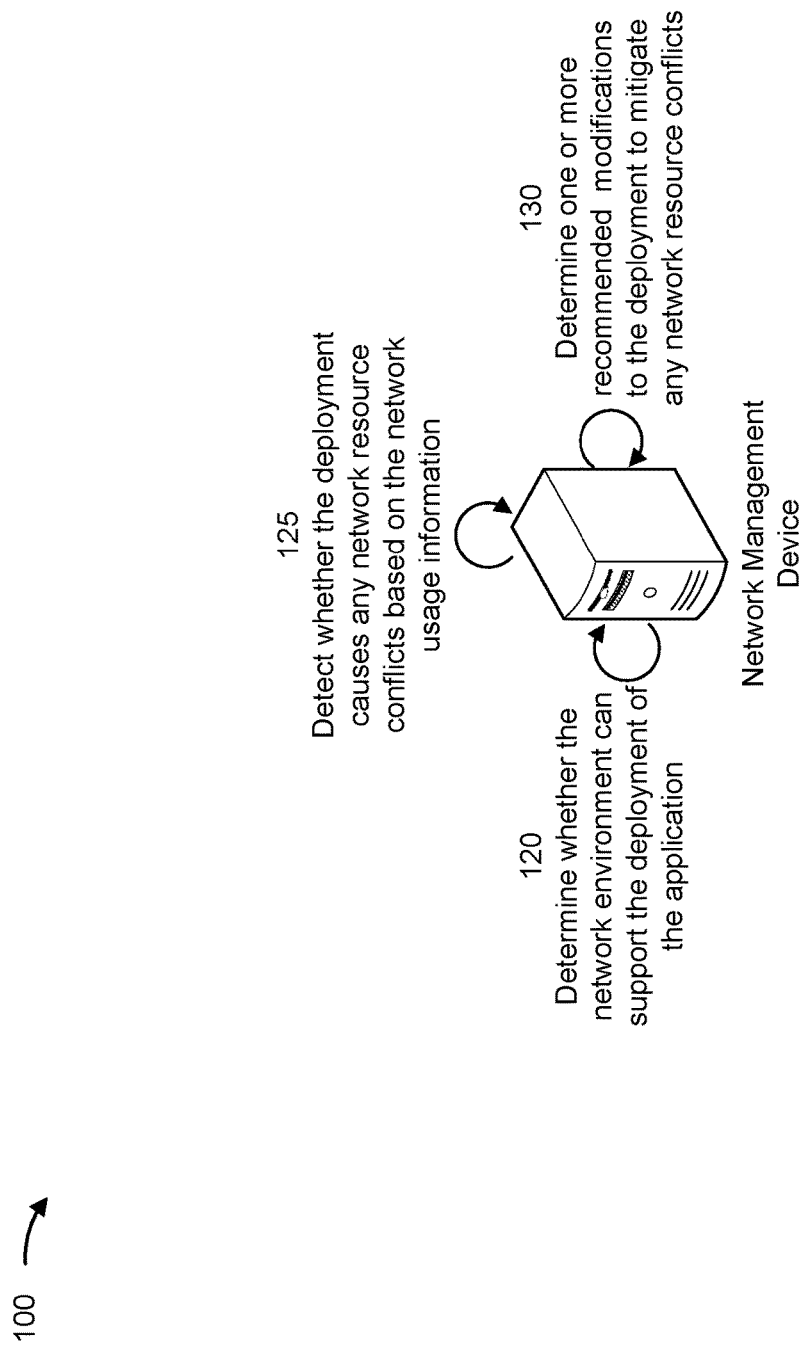
Figure 1C:
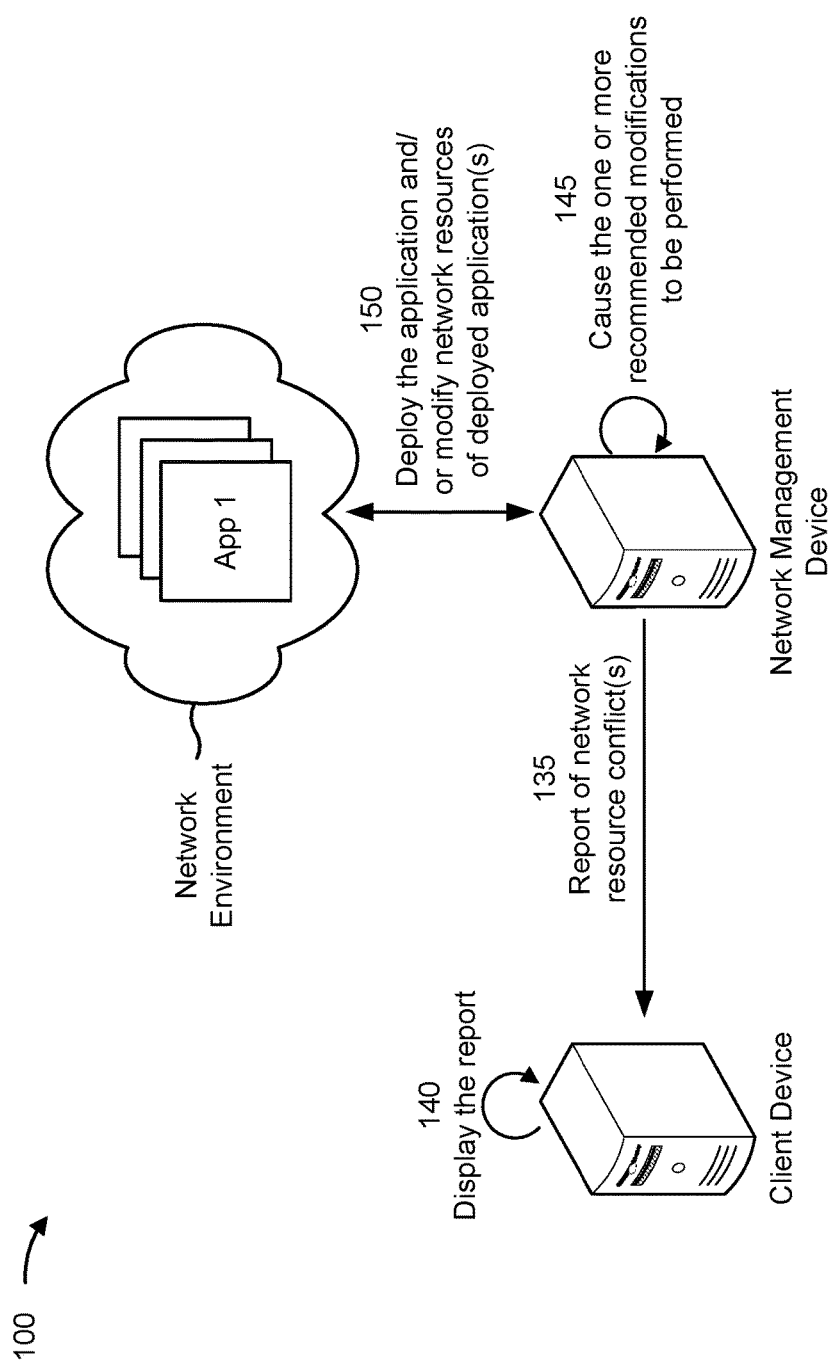

FIGS. 1A-1C are diagrams of an example 100 associated with causal analysis for network environment changes. As shown in FIGS. 1A-1C, example 100 includes a network management device, a client device, and a network environment. These devices are described in more detail in connection with FIGS. 2 and 3. The network environment may be a cloud computing environment (e.g., as described in more detail in connection with FIG. 2).

As shown in FIG. 1A, and by reference number 105, the client device may transmit, and the network management device may receive, deployment information associated with an application. The deployment information may indicate information associated with an application to be deployed in the network environment (e.g., where the application is not executing in the network and/or not currently using network resources). As another example, the deployment information may indicate a modification to a deployment of the application (e.g., where the application is currently executing in the network and/or using network resources).

For example, the client device may provide a user interface for display. The user interface may enable the deployment information to be input in an efficient and unified manner. The deployment information may include information indicative of network resources, settings, and/or configurations associated with successfully deploying and/or executing the application in the network environment. In some implementations, the deployment information may indicate timing information. The timing information may indicate a time at which the application is to be deployed. As another example, the timing information may indicate a time at which a modification associated with the application (e.g., associated with a change in the network resources, settings, and/or configurations associated with the application) is to occur.

In some implementations, the deployment information may include application artifact information, such as application code, files, binaries, libraries, and/or any other information required for the application to be executed. Such artifacts may be packaged into deployable units (such as container images, VMs, or serverless functions, depending on a deployment technique to be used) for the deployment of the application in the network environment. Additionally, or alternatively, the deployment information may include configuration settings associated with the application. The configuration settings may include one or more configuration parameters, such as a database connection string parameter, an application programming interface (API) endpoint parameter, one or more environment-specific configuration parameters, and/or other application-specific configuration parameters. The configuration settings may be indicated via a configuration file and/or one or more network environment variables.

Additionally, or alternatively, the deployment information may include one or more dependencies and/or runtime requirements. For example, the deployment information may include a version of one or more programming languages, one or more frameworks, one or more libraries, and/or other software components associated with the application. Additionally, or alternatively, the deployment information may include scalability and/or resource allocation information. For example, the deployment information may include a desired number of instances, virtual machine sizes, container orchestration parameters, auto-scaling rules, and/or any other information associated with ensuring optimal performance and resource utilization for the application.

Additionally, or alternatively, the deployment information may include network configuration information. For example, the deployment information may include one or more firewall rules, one or more load balancer configurations, one or more virtual network settings, one or more subnet assignments, one or more security permissions, and/or one or more security groups, among other examples, associated with ensuring secure and reliable network access for the application. Additionally, or alternatively, the deployment information may include storage and/or data information. For example, the deployment information may include one or more database configurations, data persistence information, one or more caching mechanisms, and/or information associated with integration with cloud storage services, among other examples. Additionally, or alternatively, the deployment information may include one or more deployment scripts and/or automation information. For example, the deployment information may include one or more manifests, one or more infrastructure-as-code templates, one or more container orchestration files, and/or one or more serverless deployment specifications, among other examples.

Additionally, or alternatively, the deployment information may include service dependency and/or integration point information. For example, the deployment information may include information about any external services or APIs that the application relies on. For example, the deployment information may include one or more endpoints, one or more access credentials, one or more authentication mechanisms, and/or one or more integration patterns, among other examples. Additionally, or alternatively, the deployment information may include monitoring and/or logging information. For example, the deployment information may include one or more log destinations, one or more metrics to be collected or monitored, one or more monitoring thresholds, and/or one or more alert or notification configurations, among other examples. Additionally, or alternatively, the deployment information may include compliance and/or security information. For example, the deployment information may include one or more encryption mechanisms, one or more access controls, compliance standards adherence information, and/or other security measure information.

As shown by reference number 110, the network management device may determine first network resources needed to deploy the application. For example, the network management device may determine, based on the deployment information, the first network resources to be used to deploy the first application via a network associated with the network environment. The deployment information may indicate the first network resources. For example, in some examples, the deployment information may include an indication of the first network resources. In other examples, the network management device may determine the first network resources based on the deployment information.

For example, the first network resources may include one or more cloud computing resources and/or services. In some implementations, the first network resources may include one or more resources associated with connectivity and/or security associated with the application. The first network resources may include one or more availability zones to be associated with the application. For example, the availability zone(s) may indicate one or more CIDR ranges and/or one or more IP addresses to be associated with the application. In some implementations, the first network resources may include one or more cloud computing regions associated with the application (e.g., based on a geographic location of an organization associated with the application and/or deployment of the application).

In some implementations, the first network resources may include one or more deployment pipelines. A deployment pipeline may include one or more automated steps, processes, databases, and/or components associated with a continuous integration, testing, and/or deployment of the application to the network environment. For example, a deployment pipeline may include a code repository and/or a code management control system. Additionally, or alternatively, the deployment pipeline may include one or more executable artifacts, such as container, a VM, and/or a serverless function, among other examples. Additionally, or alternatively, the deployment pipeline may include one or more databases, such as a code repository database, an artifact repository, and/or a monitoring and feedback database, among other examples. In some implementations, the deployment pipeline may include one or more deployment automation processes (e.g., for automatically provisioning the first network resources), and/or one or more testing environments (e.g., an environment in the network environment for testing of the application), among other examples.

In some implementations, the first network resources may include one or more virtual networks (e.g., one or more virtual private clouds (VPCs) or one or more virtual local area networks). The one or more virtual networks may indicate or be associated with one or more IP addresses, one or more subnets (e.g., a subnet may be a subdivision of a virtual network), and/or one or more network segments, among other examples. The first network resources may include one or more load balancers (e.g., associated with distributing incoming network traffic across multiple instances of the application in the network environment). Additionally, or alternatively, the first network resources may include one or more firewalls, one or more security groups, and/or one or security permissions. For example, the first network resources may include, or indicate, identity and access management (IAM) information, such as one or more IAM roles. Additionally, or alternatively, the first network resources may include one or more IP addresses, such as one or more public IP addresses (e.g., assigned to resources that are to be accessible from the internet, such as web servers or API endpoints), and/or one or more private IP addresses (e.g., for resources associated with internal operations), among other examples. Additionally, or alternatively, the first network resources may include one or more virtual private network (VPN) resources, such as one or more VPN connections (e.g., for secure and/or encrypted connections between the network environment and on-site infrastructure associated with an organization). Additionally, or alternatively, the first network resources may include domain name system (DNS) resources, such as a DNS mapping for mapping domain names to IP addresses. Additionally, or alternatively, the first network resources may include one or more network monitoring and/or logging resources.

For example, the network management device may determine and/or identify that the first network resources include one or more virtual network and/or one or more virtual servers. For example, the first network resources may include multiple instances (e.g., multiple virtual servers) associated with the application. Each instance (e.g., each virtual server) may be associated with a quantity of IP addresses. Each instance may require access to the internet (e.g., associated with an entry in a routing table). Additionally, each instance may require a peering connection (e.g., a direct network connection established between two separate networks or internet service providers, sometimes referred to as a peering link or a peering relationship). Therefore, the first network resources may include the virtual network and/or one or more virtual servers, the multiple instances, the quantity of IP addresses, the entries in the routing table(s), and/or the peering connection(s), among other examples.

As shown by reference number 115, the network management device may obtain network usage information. The network usage information may be associated with the deployment information and/or the first network resources. For example, the network usage information may indicate second network resources associated with one or more second applications in the network environment. The network usage information may be associated with one or more applications currently deployed in the network environment and/or currently using or accessing network resources. The one or more applications (e.g., the second one or more applications) may be referred to as "impacted applications" herein.

The network management device may obtain and/or determine the network usage information based on the deployment information and/or the first network resources. For example, the network management device may determine network resources (e.g., the second network resources) that may be impacted or affected by the deployment of the application using the first network resources. For example, the first network resources may be associated with (or included in) an availability zone associated with the network environment. The network management device may determine that the second network resources include one or more (or all) resources and/or applications that use the availability zone to access the network environment. As another example, the network management device may identify one or more network resources and/or applications that use a common deployment pipeline (and/or a common component, process, or service of a deployment pipeline) as the application. The network management device may determine that the second network resources include the identified one or more network resources and/or applications.

As shown in FIG. 1B, and by reference number 120, the network management device may determine whether the network environment can support the deployment of the application. For example, the network management device may determine whether the network environment supports and/or includes the first network resources. As an example, the first network resources may include one or more virtual networks and/or one or more virtual servers (e.g., multiple instances in the network environment). Each instance may need a given quantity of IP addresses. The network management device may determine if an availability zone associated with the application includes or supports the quantity of IP addresses to be used by the application. Additionally, the network management device may determine whether each instance has appropriate network connections and/or security.

For example, the network management device may determine whether each instance has an internet connection (e.g., an entry in a routing table) to enable the instance to access the internet and/or to be accessed via the internet. As another example, the network management device may determine whether each instance has one or more peering connections to enable the virtual server to communicate with other virtual servers in the network environment and/or in other network environments.

If the network management device determines that the network environment cannot support the deployment of the application (e.g., does not include or support the first network resources), then the network management device may perform one or more actions. For example, the one or more actions may include transmitting, to the client device, an indication that the network environment cannot (or currently does not) support the deployment of the application. Additionally, or alternatively, the one or more actions may include causing resources not supported or included in the network environment to be provisioned or created. For example, the one or more actions may include causing a virtual network or virtual server to be provisioned via an infrastructure of the network environment, causing one or more IP addresses to be generated and/or added (e.g., via one or more CIDR ranges), causing one or more entries to be added to a routing table, and/or causing one or more peering connections to be established, among other examples. In some implementations, the one or more actions may include modifying the deployment information to indicate the changes (such as the changes described above) to the network environment to enable the application to be deployed in the network environment.

As shown by reference number 125, the network management device may detect whether the deployment (e.g., of the application) causes any network resource conflicts based on the network usage information. For example, the network management device may detect, based on the first network resources, the second network resources, and a network capacity capability of the network environment, whether a network resource conflict will occur if the first application is deployed using the first network resources. A network resource conflict may be associated with an impact to a performance of at least one application from the one or more second applications (e.g., to at least one impacted application).

For example, the network management device may analyze the deployment of the application from the perspective of the one or more impacted applications. In other words, the network management device may analyze an impact to applications (e.g., executing via the network environment and/or utilizing resources of the network environment) that would be caused by the deployment of the application (e.g., indicated by the deployment information obtained from the client device). For example, a network resource conflict may be associated with a capacity of the network environment being exceeded, a connection issue being caused for an impacted application, and/or a network access issue caused for an impacted application, among other examples.

For example, the network capacity capability may indicate one or more limits and/or capacities for the network environment. In some implementations, the network capacity capability may indicate one or more limits for respective resource types. A resource type may include a virtual server, a virtual instance, a VM, a serverless function, a container, and/or an IP address, among other examples. For example, the network management device may detect and/or determine whether a combination of first one or more resources (e.g., from the first network resources) and second one or more resources (e.g., from the second network resources) exceeds a limit for a resource type indicated by the network capacity capability. The first one or more resources and the second one or more resources may be associated with the resource type.

For example, the resource type may be virtual servers. The network capacity capability may indicate that the network environment supports X virtual servers deployed at a given time (e.g., in a given cloud computing region). The first network resources may indicate that the application (when deployed) will use Y virtual servers. The second network resources may indicate that one or more impacted applications (e.g., in the given cloud computing region) are using (or will be using at a time when the application is to be deployed) Z virtual servers. The network management device may determine whether Y plus Z is less than or equal to X. If Y plus Z is greater than X, then the network management device may detect a network resource conflict.

As another example, the network management device may detect a network resource conflict based on the deployment information indicating that one or more network resources are to be removed and/or made idle. For example, the deployment information may indicate that one or more resources from the first network resources are to be made unavailable for the network. For example, the deployment information may indicate that some resources that were previously used for the application will no longer be used for the application. In some implementations, the deployment information may indicate that the one or more resources are to be "spun down" (e.g., shut down or deactivated in the network environment). The network management device may detect and/or determine that the second network resources use or rely on the first network resources for the performance of one or more impacted applications.

For example, the network management device may determine that one or more impacted applications use or rely on the one or more resources that are to be spun down as indicated by the deployment information. In some implementations, the network management device may determine that one or more resources that are to be spun down are included in the second network resources (e.g., described above in connection with reference number 115). The network management device may detect a network resource conflict based on the second network resources and/or the one or more impacted applications using or relying on the one or more resources that are to be spun down.

As another example, the network management device may detect a network resource conflict based on one or more security groups and/or one or more security permissions associated with one or more impacted applications. For example, the deployment information may indicate that the first network resources are associated with a first one or more security permissions and/or one or more security groups. The network management device may determine and/or detect that the second network resources use or rely on the first network resources for the performance of one or more impacted applications (e.g., in a similar manner as described above). The network management device may determine whether the first one or more security permissions will cause the one or more impacted applications to be unable to use or access at least one of the second network resources or the first network resources. For example, the deployment information may indicate (or may cause) a modification to a network resource. The network management device may determine that one or more security groups and/or one or more security permissions of the one or more impacted applications do not support and/or do not include the modified network resource. In such examples, the network management device may detect a network resource conflict.

As another example, the first network resources may be an additional one or more network resources to be included in a network resource of the second network resources. For example, the deployment information may indicate that one or more IP addresses and/or one or more CIDR ranges (e.g., included in the first network resources) are to be added to an availability zone (e.g., included in the second network resources) associated with the network environment. The network management device may determine and/or detect whether access to the second network resources will be impacted for one or more impacted application based on whether one or more security permissions for the one or more impacted application include access to the first network resources. For example, the network management device may detect a network resource conflict based on a security group for an impacted application not including access to the one or more IP addresses and/or one or more CIDR ranges (e.g., because connectivity and/or access for the impacted application may be impaired or degraded as a result of the security group not including access to the one or more IP addresses and/or one or more CIDR ranges).

In some implementations, the network management device may detect a network resource conflict based on a timing of the deployment of the application. For example, the deployment information may indicate a time at which the application is to be deployed. The network management device may determine the second network resources for a predicted traffic level of the one or more impacted applications at or after the time. For example, network resources in a cloud computing may be scalable in response to a level of traffic. Therefore, as the level of traffic changes, an amount of network resources for a given application may change. The network management device may predict a traffic level for an impacted application to predict the level of traffic at and/or after the time at which the application is to be deployed. The network management device may detect whether a network resource conflict will occur (e.g., using network resources that are based on the predicted traffic level) in a similar manner as described elsewhere herein.

As shown by reference number 130, the network management device may determine one or more recommended modifications to the deployment of the application to mitigate any network resource conflicts. Additionally, or alternatively, the network management device may determine one or more recommended modifications to network resources and/or an operation of one or more impacted applications to mitigate any network resource conflicts.

For example, the one or more recommended modifications include a modification for the first network resources, a timing of the deployment of the first application, and/or the second network resources. As an example, a recommended modification may include to use a different availability zone for deploying the application. As another example, a recommended modification may include modifying the timing of the deployment (e.g., based on the predicted traffic level(s) of one or more impacted applications). For example, the recommended modification may include modifying the timing of the deployment to a time at which the one or more impacted applications have relatively low predicted traffic level. As another example, a recommended modification may include modifying one or more security permissions and/or one or more security groups for one or more impacted applications. For example, the recommended modification may include modifying one or more security permissions and/or one or more security groups to enable access to one or more network resources that are added or provisioned as part of the deployment of the application.

In some implementations, the recommended modifications may be associated with priority levels of the application and/or the one or more impacted applications. For example, if the application has a higher priority level (e.g., indicating a higher importance or higher value application), then a recommended modification may be to modify one or more network resources associated with the impacted application(s). However, if an impacted application has a higher priority level than a priority level of the application, then a recommended modification may be to modify the first network resources associated with the deployment of the application.

In some implementations, the network management device may use a machine learning model to determine the recommended modification(s). For example, the machine learning model may be trained to optimize network resource utilization to mitigate network resource conflicts. As an example, the network management device may input, to the machine learning model, the deployment information and information associated with the one or more impacted applications (e.g., deployment information of the one or more impacted applications). The machine learning model may output one or more recommended modifications to mitigate any network resource conflicts.

As shown in FIG. 1C, the network management device may perform one or more actions based on, in response to, or otherwise associated with detecting a network resource conflict. In some implementations, the network management device may determine, via a machine learning model, the action(s) based on inputting the deployment information and information associated with the one or more second applications into the machine learning model (e.g., in a similar manner as the recommended modifications described elsewhere herein).

In some implementations, as shown by reference number 135, the one or more actions may include providing, for display, a report indicating network resource conflict information associated with the deployment of the application. The network resource conflict information may indicate the impacted application(s), one or more resources (e.g., from the second network resources) impacted by the deployment of the application, and/or one or more resources (e.g., from the first network resources) that are associated with the network resource conflict. In some implementations, the network resource conflict information may include the one or more recommended modifications (e.g., determined by the network management device, as described elsewhere herein).

The network management device may transmit, and the client device may receive, the report indicating the network resource conflict information. As shown by reference number 140, the client device may display the report. For example, the network resource conflict information may include display information for a user interface. The user interface may display the network resource conflict information. The user interface may be the same user interface associated with inputting the deployment information for the application. In other applications, the user interface may be different than the user interface associated with inputting the deployment information for the application. As a result, a developer may easily and quickly identify network resource conflicts, the impacted application(s), and/or recommended modifications to mitigate the network resource conflicts in a unified manner and prior to deploying the application (e.g., prior to the network resource conflicts actually occurring).

Additionally, or alternatively, as shown by reference number 145, the one or more actions may include causing the one or more recommended modifications (e.g., determined by the network management device as described elsewhere herein) to be performed. For example, the network management device may cause the one or more recommended modifications to be made to the deployment of the application. Additionally, or alternatively, the network management device may modify network resources and/or an operation of one or more impacted applications.

As shown by reference number 150, the one or more actions may include deploying the application and/or modifying network resources of one or more deployed applications (e.g., the one or more impacted applications). For example, the network management device may deploy, via the network environment and after causing the one or more recommended modifications to be made, the application. This mitigates degraded performance of applications executing in the network environment that would otherwise be caused by the network resource conflicts.

As indicated above, FIGS. 1A-1C are provided as an example. Other examples may differ from what is described with regard to FIGS. 1A-1C.

Figure 2:
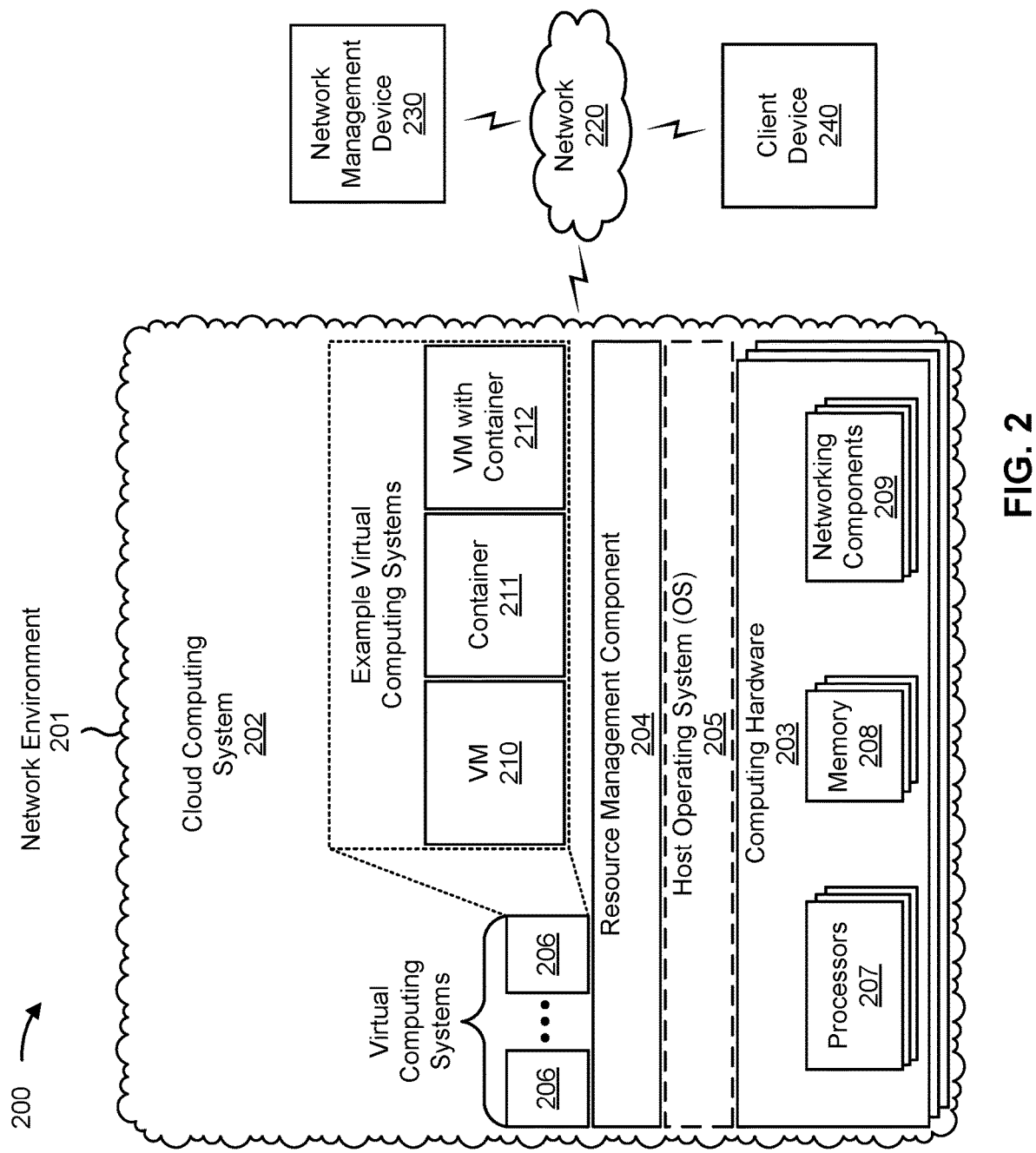
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a network environment 201, which may include one or more elements of and/or may execute within a cloud computing system 202. The cloud computing system 202 may include one or more elements 203-212, as described in more detail below. As further shown in FIG. 2, environment 200 may include a network 220, a network management device 230, and/or a client device 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the network environment 201 may include one or more elements 203-212 of the cloud computing system 202, may execute within the cloud computing system 202, and/or may be hosted within the cloud computing system 202, in some implementations, the network environment 201 may not be cloud-based (e.g., may be implemented outside of a cloud computing system) or may be partially cloud-based. For example, the network environment 201 may include one or more devices that are not part of the cloud computing system 202, such as device 300 of FIG. 3, which may include a standalone server or another type of computing device. The network environment 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The network management device 230 may include one or more devices capable of receiving, generating, storing, processing, providing, and/or routing information associated with causal analysis for network environment changes, as described elsewhere herein. The network management device 230 may include a communication device and/or a computing device. For example, the network management device 230 may include a server, such as an application server, a client server, a web server, a database server, a host server, a proxy server, a virtual server (e.g., executing on computing hardware), or a server in a cloud computing system. In some implementations, the network management device 230 may include computing hardware used in a cloud computing environment, such as the network environment 201.

The client device 240 may include one or more devices capable of receiving, generating, storing, processing, and/or providing information associated with causal analysis for network environment changes, as described elsewhere herein. The client device 240 may include a communication device and/or a computing device. For example, the client device 240 may include a server device, a wireless communication device, a mobile phone, a user equipment, a laptop computer, a tablet computer, a desktop computer, a wearable communication device, or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
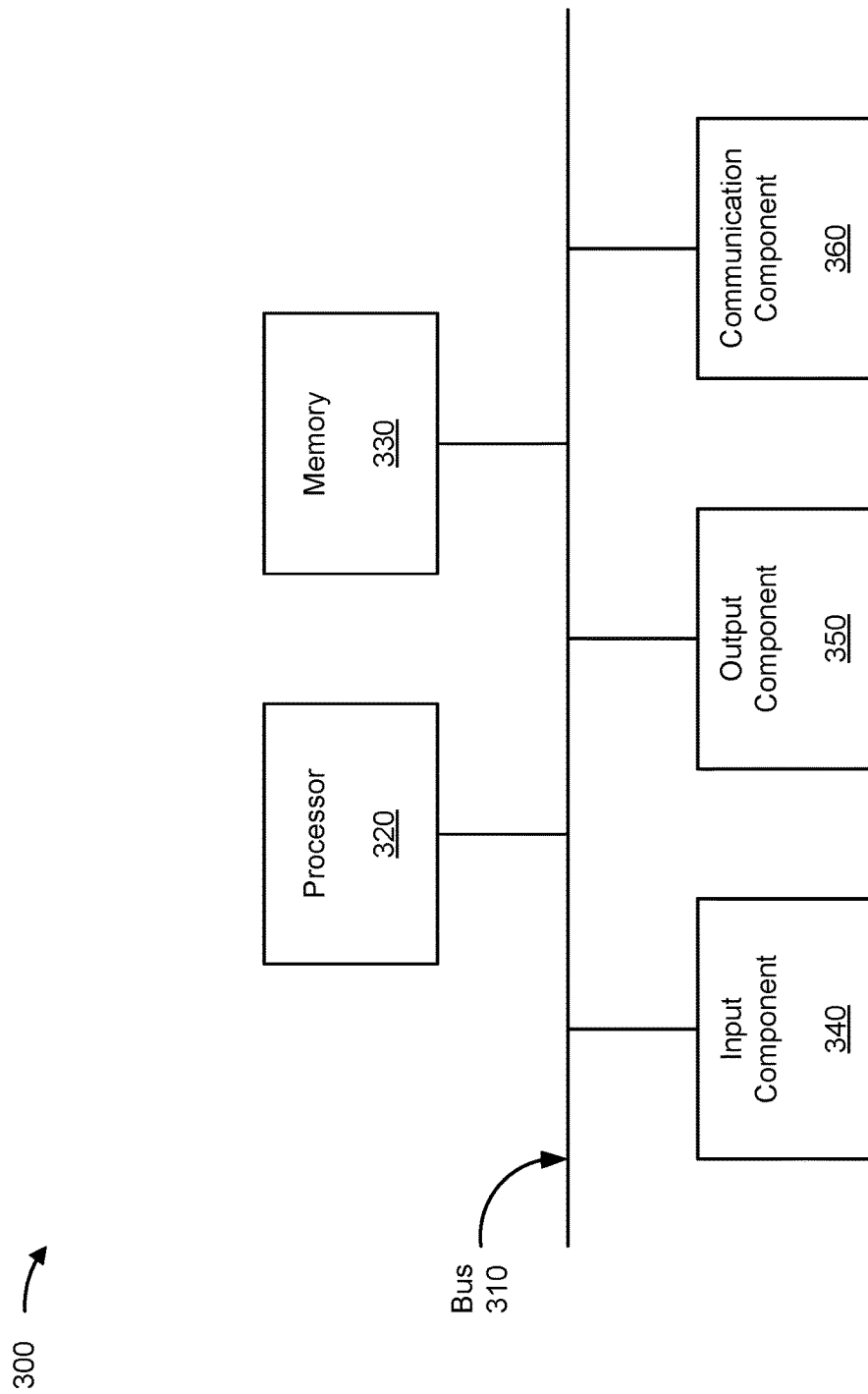
FIG. 3 is a diagram of example components of a device associated with causal analysis for network environment changes, in accordance with some embodiments of the present disclosure.

FIG. 3 is a diagram of example components of a device 300 associated with causal analysis for network environment changes. The device 300 may correspond to the cloud computing system 202, the one or more elements 203-212 of the cloud computing system 202, the network management device 230, and/or the client device 240. In some implementations, the cloud computing system 202, the one or more elements 203-212 of the cloud computing system 202, the network management device 230, and/or the client device 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
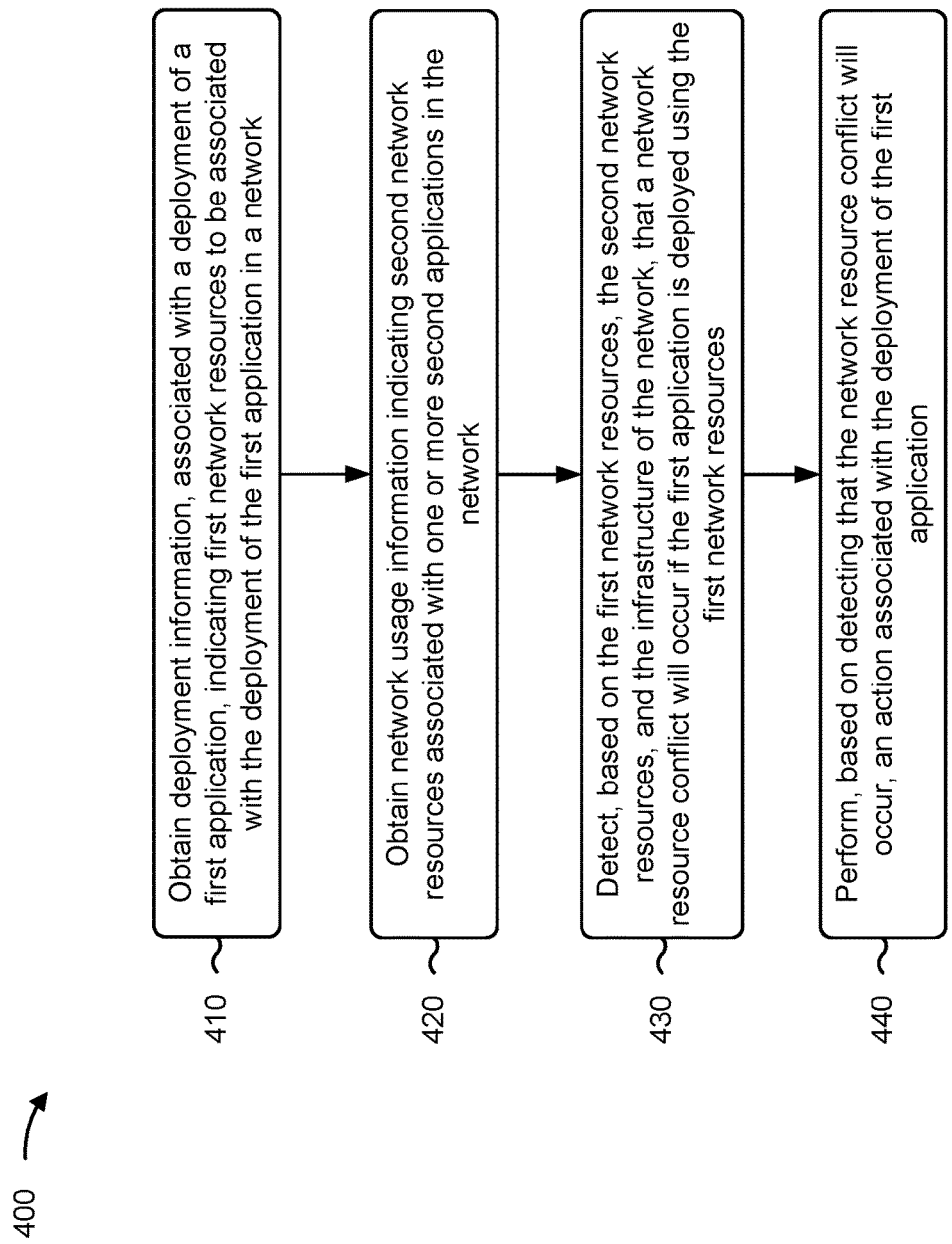
FIG. 4 is a flowchart of an example process associated with causal analysis for network environment changes, in accordance with some embodiments of the present disclosure.

FIG. 4 is a flowchart of an example process 400 associated with causal analysis for network environment changes. In some implementations, one or more process blocks of FIG. 4 may be performed by the network management device 230. In some implementations, one or more process blocks of FIG. 4 may be performed by another device or a group of devices separate from or including the network management device 230, such as the client device 240, the network environment 201, the cloud computing system 202, and/or one or more components of the cloud computing system 202. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining deployment information, associated with a deployment of a first application, indicating first network resources to be associated with the deployment of the first application in a network (block 410). For example, the network management device 230 (e.g., using processor 320 and/or memory 330) may obtain deployment information, associated with a deployment of a first application, indicating first network resources to be associated with the deployment of the first application in a network, as described above in connection with reference number 105 of FIG. 1A. As an example, the deployment information may indicate information associated with the application to be deployed in the network environment (e.g., where the application is not executing in the network and/or not currently using network resources). As another example, the deployment information may indicate a modification to a deployment of the application (e.g., where the application is current executing in the network and/or using network resources).

As further shown in FIG. 4, process 400 may include obtaining network usage information indicating second network resources associated with one or more second applications in the network (block 420). For example, the network management device 230 (e.g., using processor 320 and/or memory 330) may obtain network usage information indicating second network resources associated with one or more second applications in the network, as described above in connection with reference number 115 of FIG. 1A. In some implementations, the second network resources are associated with the first network resources in an infrastructure of the network. As an example, the second network resources may include, rely on, use, and/or otherwise be associated with the first network resources. As an example, the second network resources may include an availability zone of the infrastructure and the first network resources may include one or more IP addresses and/or one or more CIDR ranges associated with the availability zone.

As further shown in FIG. 4, process 400 may include detecting, based on the first network resources, the second network resources, and the infrastructure of the network, that a network resource conflict will occur if the first application is deployed using the first network resources (block 430). For example, the network management device 230 (e.g., using processor 320 and/or memory 330) may detect based on the first network resources, the second network resources, and the infrastructure of the network, that a network resource conflict will occur if the first application is deployed using the first network resources, as described above in connection with reference number 125 of FIG. 1B. In some implementations, the network resource conflict is associated with an impact to a performance of at least one application from the one or more second applications. As an example, the network management device 230 may detect that a security group of the at least one application does not permit access to the one or more IP addresses and/or one or more CIDR ranges associated with the first network resources.

As further shown in FIG. 4, process 400 may include performing an action associated with the deployment of the first application (block 440). For example, the network management device 230 (e.g., using processor 320 and/or memory 330) may perform an action associated with the deployment of the first application, as described above in connection with reference numbers 135, 145, and/or 150 of FIG. 1C. As an example, the network management device 230 may cause a report to be provided indicating the network resource conflict. Additionally, or alternatively, the network management device 230 may cause one or more modifications to be made to the deployment of the application and/or the at least one application. Additionally, or alternatively, the network management device 230 may cause the application to be deployed after performing the action(s) to mitigate the detected network resource conflict.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for causal analysis for network environment changes, the system comprising:
    one or more memories; and
    one or more processors, communicatively coupled to the one or more memories, configured to:
    obtain deployment information associated with a deployment of a first application;
    determine, based on the deployment information, first network resources to be used to deploy the first application via a network;
    obtain network usage information indicating second network resources associated with one or more second applications in the network;
    detect, based on the first network resources, the second network resources, and a network capacity capability of the network, whether a network resource conflict will occur if the first application is deployed using the first network resources,
        wherein the network resource conflict is associated with an impact to a performance of at least one application from the one or more second applications; and
    perform, based on detecting that the network resource conflict will occur, an action associated with the deployment of the first application,
        wherein the one or more processors, to perform the action, are configured to:
            modify at least one of:
                one or more of the first network resources, or
                one or more of the second network resources.

2. The system of claim 1, wherein the one or more processors, to detect whether the network resource conflict will occur, are configured to:
    detect whether a combination of the first network resources and the second network resources exceeds a limit for a resource type indicated by the network capacity capability,
        wherein the first network resources and the second network resources are associated with the resource type.

3. The system of claim 1, wherein the deployment information indicates that the first network resources are to be made unavailable for the network, and wherein the one or more processors, to detect whether the network resource conflict will occur, are configured to:
    detect that the second network resources use or rely on the first network resources for the performance of the at least one application.

4. The system of claim 1, wherein the deployment information indicates that the first network resources are associated with a first one or more security permissions, and wherein the one or more processors, to detect whether the network resource conflict will occur, are configured to:
    detect that the second network resources use or rely on the first network resources for the performance of the at least one application; and
    determine whether the first one or more security permissions will cause the at least one application to be unable to use or access at least one of the second network resources or the first network resources.

5. The system of claim 1, wherein the first network resources are an additional one or more network resources to be included in the second network resources, and wherein the one or more processors, to detect whether the network resource conflict will occur, are configured to:
    detect whether access to the second network resources will be impacted for the at least one application based on whether one or more security permissions for the at least one application include access to the first network resources.

6. The system of claim 1, wherein the one or more processors, to perform the action, are configured to:
    provide, for display, an indication that the network resource conflict will occur if the first application is deployed.

7. The system of claim 1, wherein the one or more processors, to perform the action, are configured to:
    modify a timing of the deployment of the first application.

8. The system of claim 1, wherein the first network resources and the second network resources include cloud computing resources.

9. The system of claim 1, wherein the first network resources and the second network resources include at least one of:
    one or more internet protocol addresses,
    one or more availability zones,
    one or more cloud computing regions,
    one or more classes of inter-domain routing ranges, or
    one or more deployment pipelines.

10. A method for causal analysis of network environment changes, comprising:
    obtaining, by a device, deployment information associated with a deployment of a first application,
        wherein the deployment information indicates first network resources to be associated with the deployment of the first application in a network; and wherein the deployment information indicates a time at which the first application is to be deployed;
obtaining, by the device, network usage information indicating second network resources associated with one or more second applications in the network,
wherein the second network resources are associated with the first network resources in an infrastructure of the network, and
wherein the second network resources are associated with a predicted traffic level of the one or more second applications at or after the time;
detecting, by the device and based on the first network resources, the second network resources, and the infrastructure of the network, that a network resource conflict will occur if the first application is deployed using the first network resources,
wherein the network resource conflict is associated with an impact to a performance of at least one application from the one or more second applications; and
performing, by the device based on detecting that the network resource conflict will occur, an action associated with the deployment of the first application.

11. The method of claim 10, wherein performing the action comprises:
providing, for display, a report indicating network resource conflict information associated with the deployment of the first application, wherein the network resource conflict information indicates at least one of:
the at least one application, or
one or more resources, from the second network resources, impacted by the deployment of the first application.

12. The method of claim 10, wherein performing the action comprises:
determining, via a machine learning model, the action based on inputting the deployment information and information associated with the one or more second applications into the machine learning model.

13. The method of claim 10, wherein performing the action comprises:
determining one or more recommended modifications to the deployment of the first application to mitigate the network resource conflict, wherein the one or more recommended modifications include a modification for at least one of:
the first network resources,
a timing of the deployment of the first application, or
the second network resources.

14. The method of claim 13, wherein performing the action comprises:
providing, for display, an indication of the one or more recommended modifications.

15. The method of claim 13, wherein performing the action comprises:
causing the one or more recommended modifications to be made to the deployment of the first application; and
deploying, via the network and after causing the one or more recommended modifications to be made, the first application.

16. A non-transitory computer-readable medium storing a set of instructions, the set of instructions comprising:
one or more instructions that, when executed by one or more processors of a device, cause the device to:
obtain deployment information associated with a deployment of a first application, wherein the deployment information indicates first network resources to be used to deploy the first application via a network;
obtain network usage information indicating second network resources associated with one or more second applications in the network;
detect, based on the first network resources, the second network resources, and a network capacity capability of the network, whether a network resource conflict will occur if the first application is deployed using the first network resources based on one or more security groups or one or more security permissions associated with one or more of the first application or at least one application from the one or more second applications,
wherein the network resource conflict is associated with an impact to a performance of the at least one application; and
perform, based on detecting that the network resource conflict will occur, an action associated with the deployment of the first application.

17. The non-transitory computer-readable medium of claim 16, wherein the one or more instructions, that cause the device to detect whether the network resource conflict will occur, cause the device to:
detect whether a combination of the first network resources and the second network resources exceeds a limit for a resource type indicated by the network capacity capability,
wherein the first network resources and the second network resources are associated with the resource type.

18. The non-transitory computer-readable medium of claim 16, wherein the first network resources include one or more internet protocol addresses and the second network resources include one or more availability zones associated with the one or more internet protocol addresses.

19. The method of claim 10, wherein the deployment information indicates that the first network resources are to be made unavailable for the network, and
wherein detecting whether the network resource conflict will occur comprises:
detecting that the second network resources use or rely on the first network resources for the performance of the at least one application.

20. The non-transitory computer-readable medium of claim 16, wherein the deployment information indicates that the first network resources are to be made unavailable for the network, and
wherein the one or more instructions, that cause the device to detect whether the network resource conflict will occur cause the device to:
detect that the second network resources use or rely on the first network resources for the performance of the at least one application.

* * * * *